United States Patent [19]
Anderson et al.

[11] Patent Number: 5,088,344
[45] Date of Patent: Feb. 18, 1992

[54] MARINE PROPULSION INTERNAL COMBUSTION ENGINE

[75] Inventors: Philip A. Anderson, Waukegan; William A. Bernau, Lindenhurst, both of Ill.; Paul W. Breckenfeld, Kenosha, Wis.; Geroge L. Broughton, Zion, Ill.; Wallace R. Karrasch, Milwaukee, Wis.

[73] Assignee: Outboard Marine Corporation, Waukegan, Ill.

[21] Appl. No.: 623,272

[22] Filed: Dec. 6, 1990

Related U.S. Application Data

[63] Continuation of Ser. No. 315,593, Feb. 27, 1989, abandoned.

[51] Int. Cl.$^5$ .............................................. G05G 1/00
[52] U.S. Cl. ........................................ 74/572; 74/595; 403/370; 464/68
[58] Field of Search ................... 74/572, 573 R, 574, 74/567, 604, 605, 443, 468; 464/7, 68; 403/370

[56] References Cited

U.S. PATENT DOCUMENTS

| 4,420,070 | 12/1983 | Maucher et al. | 192/48.8 |
| 4,663,983 | 5/1987 | Kobayashi et al. | 74/574 |
| 4,706,414 | 11/1987 | Muzik | 403/370 |
| 4,790,419 | 12/1988 | Loizeau | 74/574 X |
| 4,848,183 | 7/1989 | Ferguson | 74/574 |
| 4,850,932 | 7/1989 | Kagiyama et al. | 464/68 |

*Primary Examiner*—Vinh T. Luong
*Attorney, Agent, or Firm*—Michael, Best & Friedrich

[57] ABSTRACT

An internal combustion engine comprising an engine block, a crankshaft rotatably supported by the block and including an axis, a first portion which is cylindrical in shape, which is concentric with the axis, and which has a uniform radius, and a second portion extending from the first portion in concentric relation thereto and having a radius less than the radius of the first portion to define a radially extending shoulder on the first portion, a flywheel including a surface engaging the shoulder, and a central aperture receiving the second portion of the crankshaft and having a radius less then the radius of the first portion, and bolts extending through the flywheel and into the first portion of the crankshaft for securing the flywheel to the crankshaft.

8 Claims, 2 Drawing Sheets

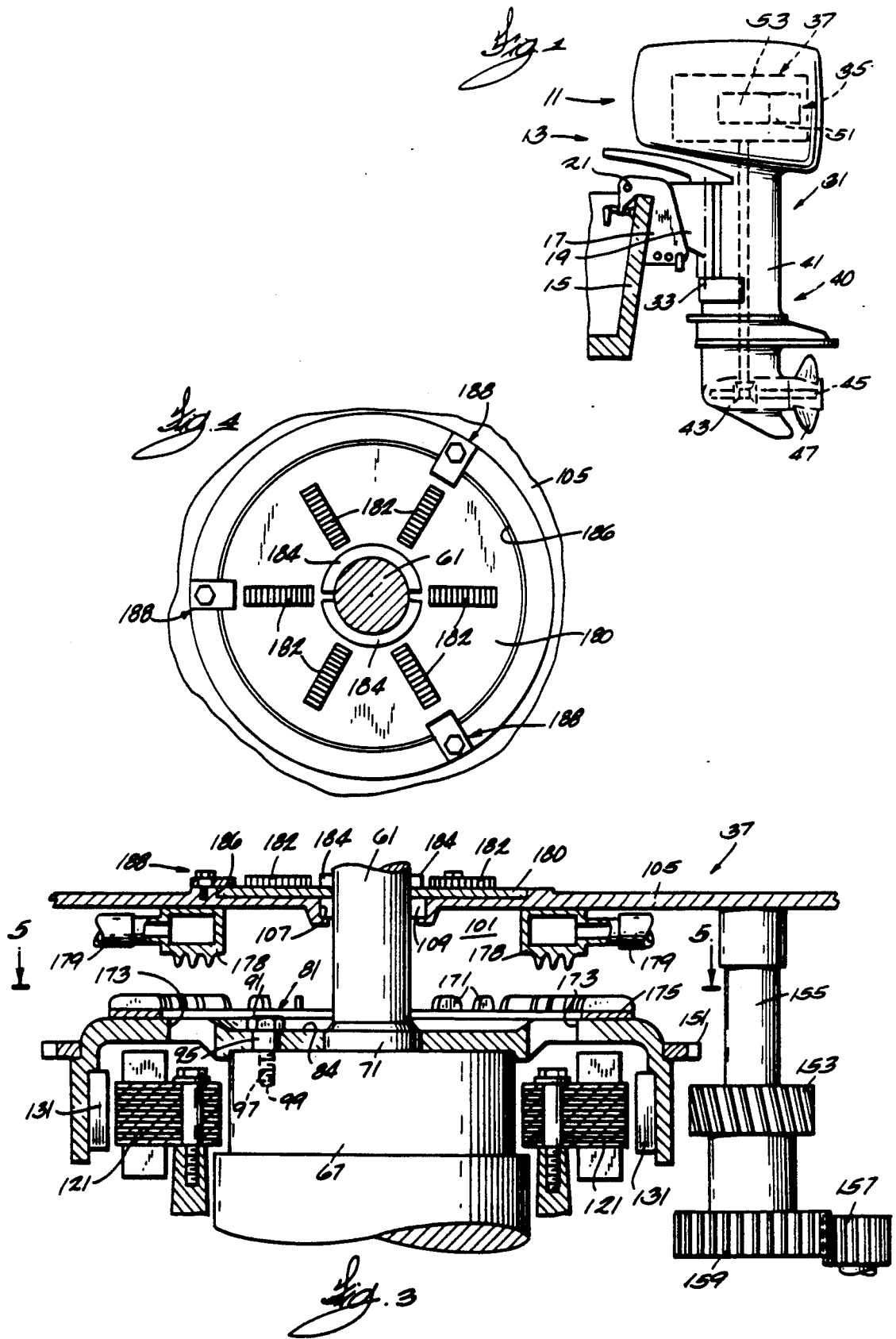

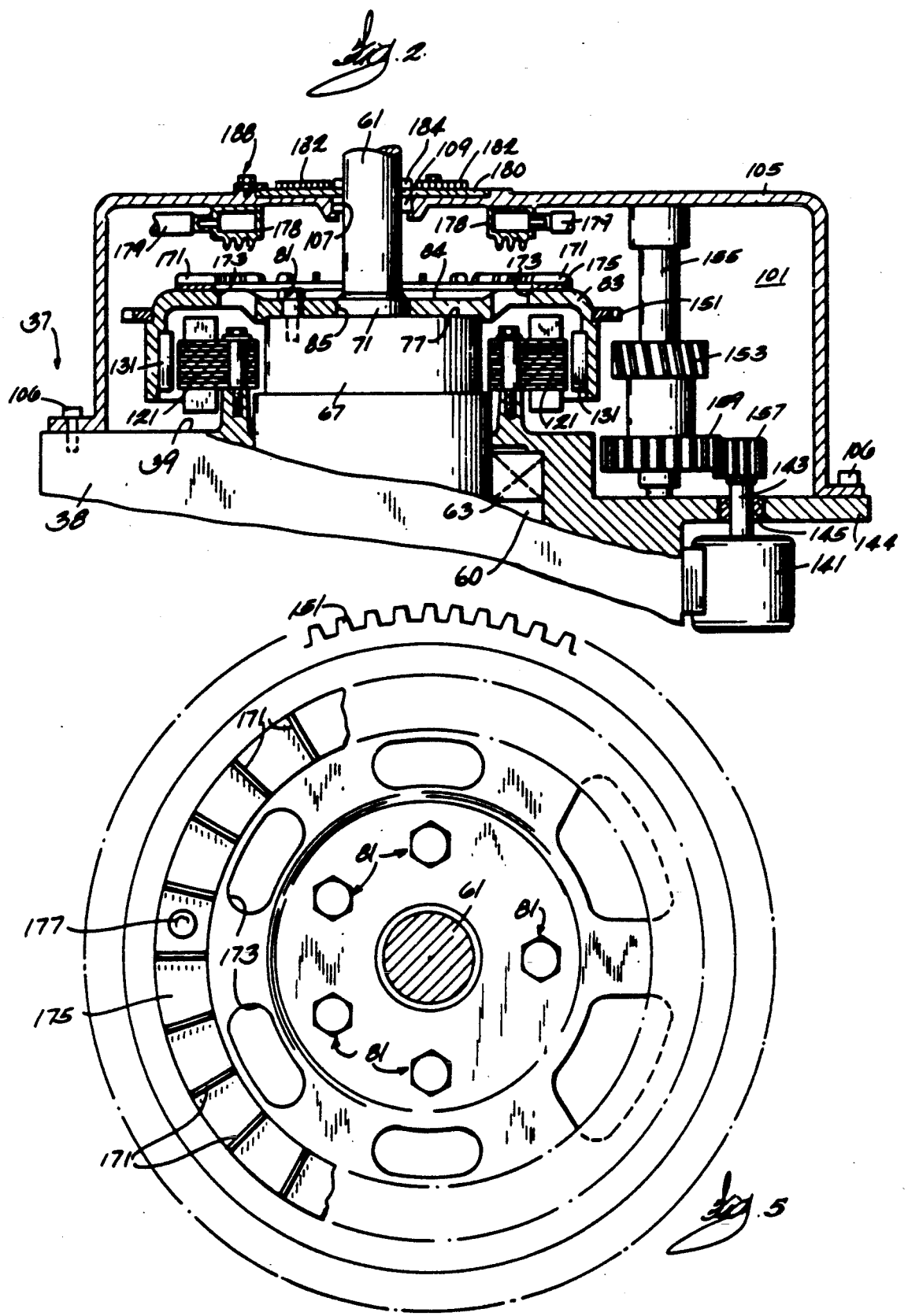

MARINE PROPULSION INTERNAL COMBUSTION ENGINE

This is a continuation of Ser. No. 315,593, filed Feb. 27, 1989 and now abandoned.

BACKGROUND OF THE INVENTION

1. Field of the Invention

The invention relates generally to outboard motors including internal combustion engines. More particularly, the invention also relates to internal combustion engines included in outboard motors.

Still more particularly, the invention relates to means for connecting a flywheel to a crankshaft of an internal combustion engine of an outboard motor.

2. Description of the Related Art

Attention is directed to the following United States patents.

| Maucher, et al. | 4,420,070 | Dec. 13, 1983 |
| Kobayaski, et al. | 4,663,983 | May 12, 1987 |

SUMMARY OF THE INVENTION

The invention provides an internal combustion engine comprising an engine block, a crankshaft rotatable supported by the block and including a first portion having a radius, and a second portion extending from the first portion in concentric relation thereto and having a radius less than the radius of the first portion so as to define a radially extending shoulder on the first portion, a flywheel including a surface engaging the shoulder, and a central aperture receiving the second portion of the crankshaft and having a radius less than the radius of the first portion, and means extending through the flywheel and into the first portion of the crankshaft for securing the flywheel to the crankshaft.

The invention also provides an internal combustion engine comprising an engine block, a crankshaft rotatably supported by the block and including an axis, a first portion which is cylindrical in shape, which is concentric with the axis, and which has a uniform radius, and a second portion extending from the first portion in concentric relation thereto and having a radius less than the radius of the first portion so as to define a radially extending shoulder on the first portion, a flywheel including a surface engaging the shoulder, a plurality of openings extending in spaced parallel relation to each other and to the axis, and a central aperture receiving the second portion of the crankshaft and having a radius less then the radius of the first portion, and a like plurality of the bolts each including a head engaging the flywheel, a non-threaded shank portion which extends from the head and which is snugly engaged in one of the openings, and a threaded shank portion which extends from the non-threaded shank portion and which is threadedly received in the first portion of the crankshaft.

Other features and advantages of the invention will become apparent to those skilled in the art upon review of the following detailed description, claims, and drawings.

BRIEF DESCRIPTION OF THE DRAWINGS

FIG. 1 is a side elevational view of an outboard motor embodying the invention and comprising an engine including a crankshaft and a flywheel.

FIG. 2 is an enlarged elevational view, partially in section, of the engine taken generally along line 2—2 in FIG. 4.

FIG. 3 is a further enlarged, partial view of the engine taken generally along line 2—2 in FIG. 4.

FIG. 4 is a top plan view of the engine.

FIG. 5 is a view taken along line 5—5 in FIG. 3.

Before one embodiment of the invention is explained in detail it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Shown in the drawings (see FIG. 1) is an outboard motor 11 comprising a mounting assembly 13 adapted to be connected to a boat transom 15. More specifically, the mounting assembly 13 includes a transom bracket 17 adapted to be fixed to the transom 15, and a swivel bracket 19 pivotally connected to the transom bracket 17 for swinging movement relative thereto about a tilt axis 21 which is generally horizontal when the transom bracket 17 is fixed t the boat transom 15.

The outboard motor 11 also includes a propulsion unit 31 connected to the swivel bracket 19 for pivotal movement in common with the swivel bracket 19 about the tilt axis 21 and for swinging movement relative to the swivel bracket 19 about a steering axis 33 which extends transversely of the tilt axis 21 and which is generally vertical when the propulsion unit 31 is in the normal running position.

The propulsion unit 31 also includes a power head 35 which comprises an internal combustion engine 37 defined, in part, by (see FIG. 2) an engine block 38 having an upper exterior surface 39. The propulsion unit 31 also includes (see FIG. 1) a lower unit 40 including a drive shaft housing 41 which, at its upper end, supports the power head 35 and which, at its lower end, is fixed to a gearcase 43 rotatable supporting a propeller shaft 45 which is driven by the engine 37 and which carries a propeller 47.

The engine block 38 defines one or more cylinders 51 (one shown schematically in FIG. 1) which respectively extend from a like number of one or more crankcases 53 (one shown schematically). In addition, the engine block 38 has an interior 60 and rotatably supports a crankshaft 61 which is journaled, in part, by bearings 63 (one shown in FIG. 2) supported interiorly of and by the engine block 38, and which includes a first or upper portion 67 extending above the upper surface 39 of the engine block 38. In addition, the crankshaft 61 includes a second or end portion 71 which projects above the first or upper portion 67 and which has a diameter less than the diameter of the first or upper portion 67 so as to define a radially extending shoulder 77 at the upper end of the first or upper portion 67.

Fixed or secured to the crankshaft shoulder 77 by suitable means in the form of one or more bolts 81 is a flywheel 83 having an outer or upper surface 84 extending generally perpendicularly to the crankshaft 61 and facing away from the engine block 38. The flywheel 83 also has a central aperture 85 which has a diameter slightly larger than the diameter of the second or end crankshaft portion 71 and through which the second crankshaft portion 71 extends. While other constructions can be employed, in the illustrated construction, as shown in FIG. 5, five bolts 81 are employed. More specifically, in this regard, the bolts 81 are identical and each bolt 81 includes (see FIG. 3) an enlarged head 91 engaging the upper surface 84 of the flywheel 83 and a shank portion including a non-threaded cylindrical part 95 which is snugly received in a cooperating aperture 96 (FIG. 2) in the flywheel 83 and which has a diameter less than the diameter of the head 91, and a threaded end part 97 which, in the preferred embodiment, has a diameter less than the diameter of the part 95 and which is received in a threaded bore 99 extending into the crankshaft first or upper portion 67 from the shoulder 77. Accordingly, tightening of the bolts 81 into the crankshaft upper portion 67 fixedly attaches the flywheel 83 to the crankshaft 61.

The flywheel 83 is located, as shown in FIG. 2, in a substantially sealed chamber 101. Various arrangements can be employed for providing the sealed chamber 101. In the disclosed construction, the sealed chamber 101 is defined, in part, by an upper engine block surface which can be the upper engine block surface 39 and by a cover 105 which is suitably fixed to the engine block 38 in sealing engagement therewith. In this last regard, a gasket (not shown) can be employed between the cover 105 and the engine block 38 and a suitable number of bolts or screws 106 (FIG. 2) can be employed to fix the cover 105 to the engine block 38. The crankshaft portion 71 projects through a suitable aperture 107 in the cover 105. A suitable seal 109 is provided between the crankshaft 61 and the cover 105 to prevent fluid flow to or from the sealed chamber 101. While other materials can be employed, the cover 105 is preferably fabricated of plastic or composite material. The resulting sealed chamber 101 provides a space from which moisture, and especially salt moisture from sea water, can be excluded and into which a fuel/lubricant mist is supplied from the uppermost of the crankcases 53 in response to pulsating crankcase pressure, and through the bearing 63 notwithstanding the usual crankcase seal (not shown) which ordinarily serves to substantially reduce pressure and fluid loss from the uppermost of the crankcases 53.

Also included in the sealed chamber 101 is means for generating an electrical potential for charging a battery (not shown). While other constructions can be employed, in the disclosed construction, such means comprises at least one first member or stator 121 which is fixedly mounted on the engine block 38 and which includes one or more coils and coil cores terminating in closely adjacent relation to a second member or armature 131 in the form of one or more magnets supported for rotation in a path adjacent the stator 121. In the preferred embodiment, the magnets are carried by the flywheel 83. Any suitable construction for the stator 121 and armature 131 can be employed. In alternative embodiments, the armature 131 can be fixed to the engine block 38 and the stator 121 can be fixed to the flywheel 83.

Also located in the sealed chamber 101 is a mechanism for starting the engine 37 in response to a rotary input. In this regard, suitably mounted on the engine block 38 exteriorly of the sealed chamber 101 is a starting motor 141 (FIG. 2) which includes an output shaft 143 extending into the sealed chamber 101 to provide the rotary input referred to immediately above. In the preferred embodiment, the shaft 143 extends into the chamber 101 through a flange 144 which is an integral part of the engine block 38 and which partially defines the upper surface 39 of the block 38. Suitable seal means 145 can be provided between the output shaft 143 and the flange 144 to prevent fluid flow into or out of the sealed chamber 101.

The engine starting mechanism is of the "Bendix" type and includes a gear 151 on the periphery of the flywheel 83 and a pinion 153 which is movable axially of a rotatably mounted shaft 155 and into a position of driving engagement with the flywheel gear 151 in response to rotation of the shaft 155. The shaft 155 is rotated in response to rotation of the output shaft 143 via a gear 157 which is mounted on the shaft 143 and a gear 159 which meshes with the gear 157 and which is mounted on the shaft 155. Any suitable means within the sealed chamber 101 can be employed to rotatably support the shaft 155 in position to afford driving connection with the output shaft 143 of the starter motor 141 and to afford movement of the drive pinion 153 into and out of driving engagement with the flywheel gear 151. As "Bendix" type starting mechanisms are well known, no further description is believed to be necessary.

Means are provided for circulating the air and the fuel/lubricant mist in the sealed chamber 101. In this regard, as shown in FIGS. 2, 3 and 5, the flywheel 83 is provided with a series of vanes or fins 171 and a series of adjacent apertures or openings 173, which fins 171 and openings 173 function like a centrifugal fan and agitate the air and cause circulation thereof within the sealed chamber 101. Alternatively stated, the fins 171 constitute means for creating an air flow through the openings 173. The air circulation draws heated air away from the stator 121 and armature 131 and facilitates dissipation thereof to the atmosphere through the engine block 38 and cover 105 or through cooling means still to be described. Such circulation also serves to convey the fuel/lubricant mist throughout the sealed chamber 101 and aids in carrying heat away from the stator. In the preferred embodiment, the fins 171 are formed on an annular member 175 that is secured to the upper surface 84 of the flywheel 83 by suitable means such as bolts 177 (FIG. 5).

The engine 37 also comprises means located in the chamber 101 for extracting heat from the chamber 101 by cooling the air which is circulated in the chamber 101. While various suitable means can be employed, in the preferred embodiment, this means includes a plurality of finned water jackets 178 which are secured to the underside of the cover 105 and which are located in adjacent relation to the openings 173 in the flywheel 83. The water jackets 178 are connected via suitable supply and return conduits 179 to a supply of cooling water (not shown) and to an overboard discharge. The water jackets 178 are located relative to the openings 173 so air that is drawn upwardly through the openings 173 flows in a path adjacent the water jackets 178 and transfers heat to the water jackets 178. Thus, the fins 171 and the openings 173 constitute means for creating an air flow in a path adjacent the water jackets 178.

Carried by the cover 105 on the exterior surface thereof is a timer base 180 (FIGS. 2-4) which is suitably supported for rotation about the crankshaft axis by the cover 105, which supports one or more trigger coils 182, and which surrounds the part 71 of the crankshaft 61. The crankshaft portion 71 carries a suitable magnet or magnets 184 cooperating with the trigger coil or coils 182 to generate ignition trigger pulses.

Any suitable means can be provided for fixing the timer base to the cover 105 and affording relative rotation therebetween. In the disclosed construction, the cover 105 and the timer base include interengaging means in the form of a recess 186 (FIGS. 3 and 4) in the cover 105 and a mating part of the timer base 180 for locating the timer base 180 relative to the cover 105. A suitable number of retaining means 188 are provided to fix the timer base 180 to the cover 105 in encircling relation to the crankshaft portion 71. As is conventional, the timer base 180 can be operably connected to a suitable linkage (not shown) adapted to adjust the spark timing.

Various of the features of the invention are set forth in the following claims.

We claim:

1. An engine comprising an engine block having an exterior surface and an interior, a crankshaft extending from said engine block interior, being rotatably supported by said block, and including a first portion extending exteriorly of said engine block surface, having a first radius, and a second portion extending from said first portion in concentric relation thereto and having a second radius less than said first radius so as to define a radially extending shoulder on said first portion, a flywheel including a surface engaging said shoulder, and a central aperture receiving said second portion of said crankshaft and having a third radius less than said first radius and greater than said second radius, and means extending through said flywheel and into said first portion of said crankshaft for securing said flywheel to said crankshaft.

2. An engine in accordance with claim 1 wherein said first portion of said crankshaft is cylindrical.

3. An engine in accordance with claim 2 wherein said crankshaft has an axis, and wherein said first portion of said crankshaft is concentric about said axis.

4. An engine in accordance with claim 1 wherein said first portion of said crankshaft has a uniform radius.

5. An engine in accordance with claim 1 wherein said means includes a plurality of bolts.

6. An engine in accordance with claim 5 wherein each of said bolts includes a head engaging said flywheel, and a shank portion which extends from said head and which threadably engages said first portion of said crankshaft.

7. An engine in accordance with claim 1 wherein said flywheel includes a plurality of openings extending in spaced parallel relation to each other and to said axis, and wherein said means includes a like plurality of bolts each including a head engaging said flywheel, a non-threaded shank portion which extends from said head and which is snugly engaged in one of said openings, and a threaded shank portion which extends from said non-threaded shank portion and which is threadedly received in said first portion of said crankshaft.

8. An engine comprising an engine block having an exterior surface and an interior, a crankshaft extending from said engine block interior, being rotatably supported by said block, and including an axis, a first portion which extends exteriorly of said engine block surface, which is cylindrical in shape, which is concentric with said axis, and which has a uniform first radius, and a second portion extending from said first portion in concentric relation thereto and having a second radius less than said first radius so as to define a radially extending shoulder on said first portion, a flywheel including s surface engaging said shoulder, a plurality of openings extending in spaced parallel relation to each other and to said axis, and a central aperture receiving said second portion of said crankshaft and having a third radius less then said first radius and greater than said second radius, and a like plurality of bolts each including a head engaging said flywheel, a non-threaded shank portion which extends from said head and which is snugly engaged in one of said openings, and a threaded shank portion which extends from said non-threaded shank portion and which is threadedly received in said first portion of said crankshaft.

* * * * *